M. A. DAVIS.
VEHICLE TRAIN.
APPLICATION FILED MAR. 1, 1920.
1,381,861.
Patented June 14, 1921.
3 SHEETS—SHEET 1.
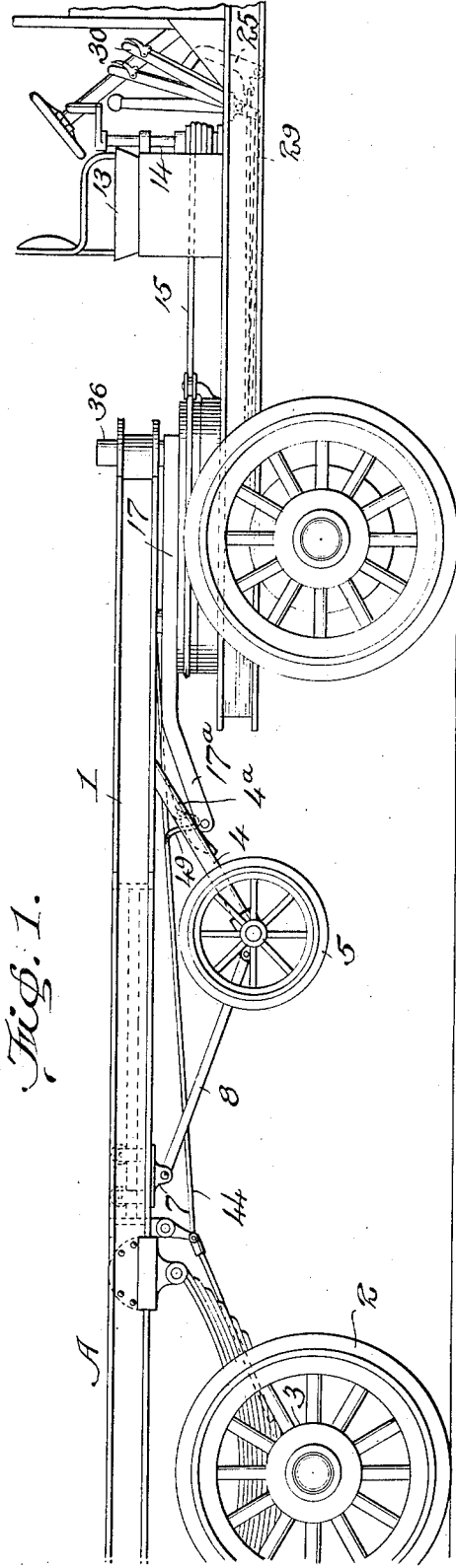
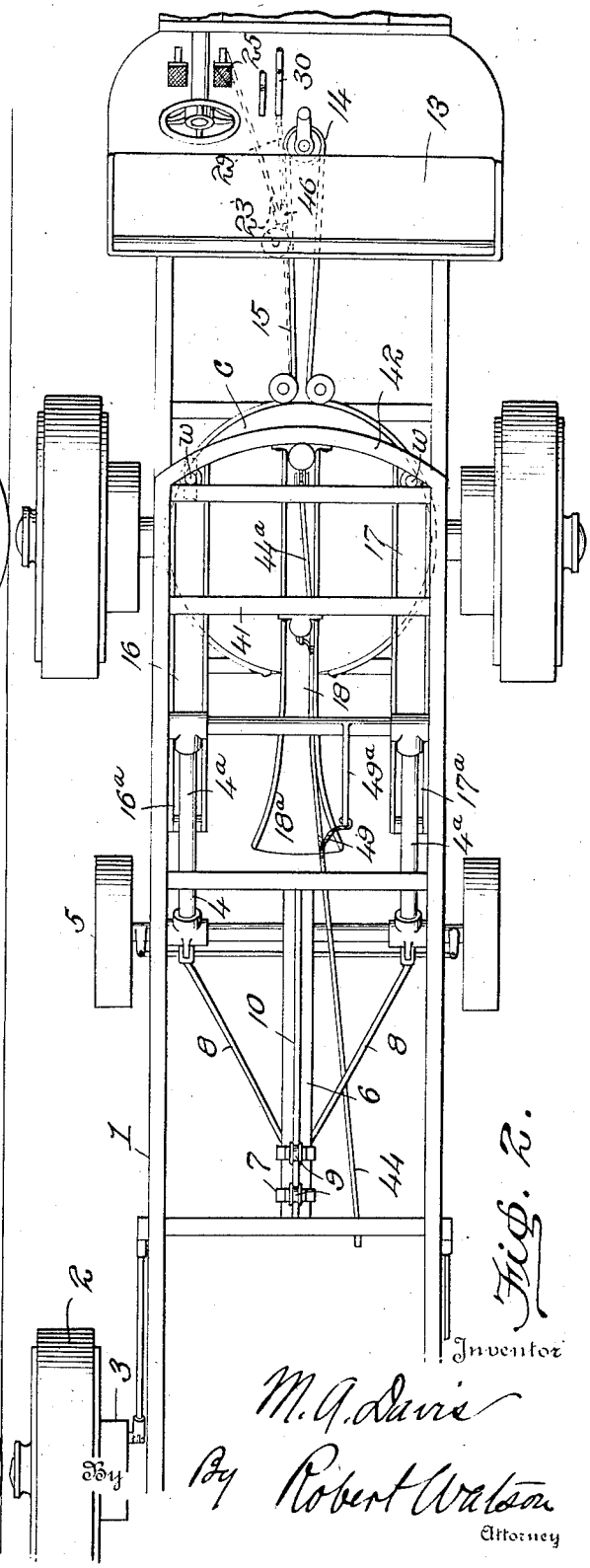

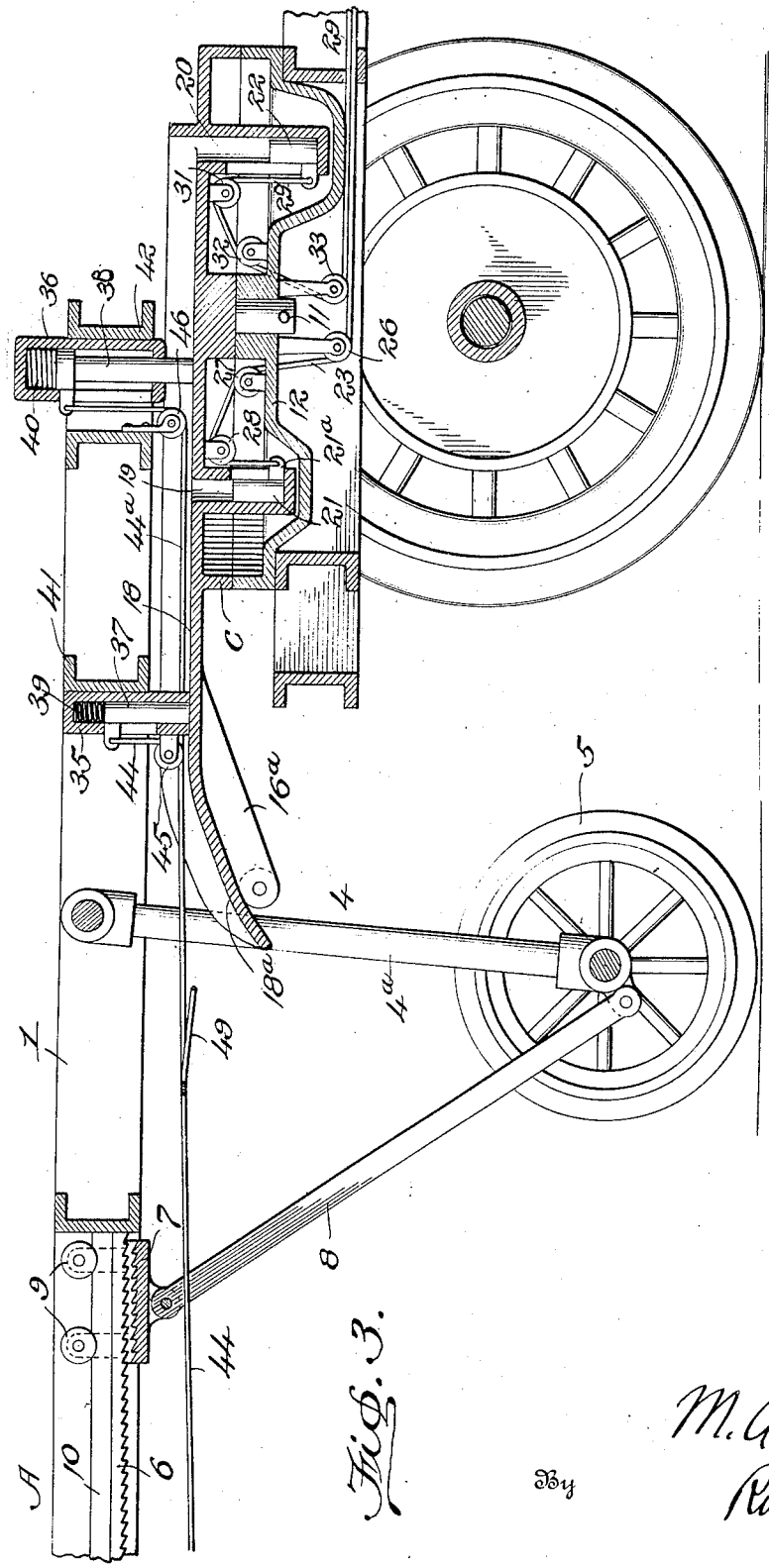

M. A. DAVIS.
VEHICLE TRAIN.
APPLICATION FILED MAR. 1, 1920.
1,381,861.
Patented June 14, 1921.
3 SHEETS—SHEET 3.
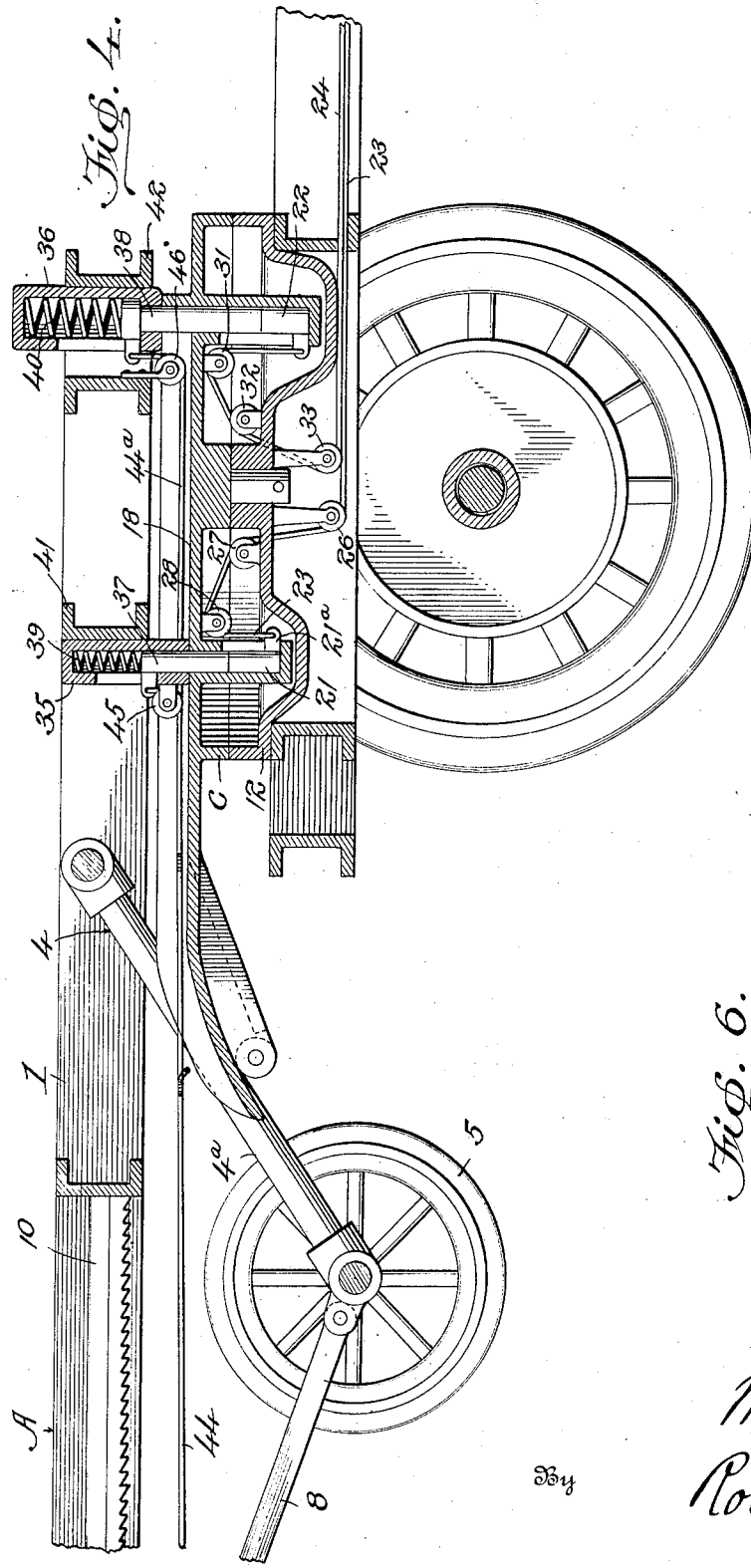

UNITED STATES PATENT OFFICE.

MANSELL A. DAVIS, OF LAPEER, MICHIGAN.

VEHICLE-TRAIN.

1,381,861. Specification of Letters Patent. Patented June 14, 1921.

Application filed March 1, 1920. Serial No. 362,547.

*To all whom it may concern:*

Be it known that I, MANSELL A. DAVIS, a citizen of the Dominion of Canada, residing at Lapeer, in the county of Lapeer and State of Michigan, have invented certain new and useful Improvements in Vehicle-Trains, of which the following is a specification.

This invention relates to improvements in tractor trains, and more particularly to coöperating devices on a tractor and semi-trailer, whereby the tractor may be coupled automatically to the trailer, and uncoupled by devices operable from the cab or seat of the driver on the tractor; whereby the brakes of the trailer may be applied and released at will by the driver while the trailer is coupled to the tractor, and whereby the brakes will be set on the trailer when the tractor is uncoupled. The invention also includes means whereby when the tractor is backed into position to engage the trailer, tension will be automatically applied to the brakes to hold the trailer stationary while its forward end is being lifted and coupled to the tractor, and whereby, as soon as the parts are coupled together the brakes on the trailer will be released. The invention also comprises means whereby the tractor and trailer may be coupled together, or uncoupled, while lying at various angles to one another, and it includes various other features, the details and advantages of which will be clear from the following specification, taken in connection with the accompanying drawing, in which;

Figure 1 is a side elevation of the tractor and semi-trailer coupled together, the forward part of the tractor being omitted;

Fig. 2 is a top plan view of the same;

Fig. 3 is a view taken on the longitudinal center of the tractor and trailer, showing the tractor backed part way under the forward end of the trailer;

Fig. 4 is a similar view showing the parts coupled;

Fig. 5 is a detail showing one of the guide-pieces for guiding the sides of the trailer onto the ways on the fifth wheel on the tractor; and, Fig. 6 is a central, longitudinal section through a portion of the trailer frame, illustrating a modified arrangement for folding the trailer support when the tractor is backed into engagement with the trailer.

Referring to Figs. 1 to 5, inclusive, of the drawing, A indicates a semi-trailer comprising a frame 1, rear wheels 2, provided with brakes 3, and a folding supporting frame 4, hinged to the forward part of the trailer body and having at its lower ends supporting wheels 5. A rack bar 6 extends longitudinally in the center of the body frame at the rear of the support 4, and a dog 7, movable along the rack, is connected to the supporting frame by a brace 8, which is hinged to the dog and said supporting frame. When the trailer is detached from the tractor, the supporting frame extends vertically downward, and in this position it is held by the brace and dog, the weight of the trailer body on the supporting frame causing an upward and backward thrust on the brace which causes the dog to lock with the rack. When the forward end of the trailer is lifted, the pressure is removed from the brace and the dog is thereby released from the rack, as shown in Fig. 3, and the dog may be moved backward along the rack when the supporting frame is moved to the folded position, shown in full lines in Fig. 1. The dog is carried by trolley wheels 9, which rest upon a track 10, above the rack.

Upon the rear end of the tractor is arranged a fifth wheel C, which is connected by a central pivot 11 to a suitable annular support 12, mounted upon the frame of the tractor, above the rear wheels of the latter. This fifth wheel is operable from a point near the driver's seat 13, by a windlass 14, to which is connected a cable 15, the ends of the latter extending in opposite directions around the fifth wheel and being secured thereto as shown in the drawing. It will be apparent that by turning the windlass the fifth wheel may be set at any desired angle with respect to the tractor body. Upon the fifth wheel are arranged two parallel guide-ways 16 and 17, at the opposite sides of the fifth wheel, and a central guideway 18, which extends across the center of the wheel. These guideways, as shown, project rearwardly from the fifth wheel and incline downwardly beyond the end of the tractor, as shown at 16$^a$, 17$^a$, and 18$^a$. The part 18$^a$ is flaring in width at its rear end, as shown, and it is formed with two sockets 19 and 20, one in advance of the other, and preferably arranged at opposite sides of the pivotal stud 11. In the lower part of these sockets are arranged ejector pins 21, 22, which are vertically movable by means of cables 23 and 29, respectively. The cable 23, is connected to a brake pedal 25, adjacent the driver's seat, and this cable passes around a pulley 26, arranged below the support for the fifth wheel and close to the axis of the latter. The cable is carried over another pulley 27 on said support and a pulley 28 on the fifth wheel, the latter being above the part 21ᵃ of the ejector 21 to which the cable is connected. It will be evident that by operating the brake pedal 25, the ejector 21 may be raised or lowered. In a similar way, the ejector 22 is connected by the cable 29 to a lever 30, adjacent the driver's seat, so that by operating said lever the ejector 22 may be raised or lowered. The cable 29 extends from the ejector around a pulley 31, mounted on the fifth wheel above the ejector, and the cable thence passes around pulleys 32 and 33, carried by the support 12, and arranged near the axis of the fifth wheel. By extending the cables 23 and 29 around the pulleys 26 and 33, arranged near the axis of the fifth wheel, it will be evident that the cables may be used to operate the ejectors in any position of the fifth wheel with respect to the truck body.

Upon the forward end of the trailer body are arranged, in housings 35 and 36, vertically movable pins 37 and 38, respectively, which pins are normally pressed in a downward direction by suitable springs 39 and 40, arranged within the housings. The housing 35 is secured to the central part of a cross bar 41, and the housing 36 is secured to the central part of an end bar 42, and the housings are spaced apart so that the pins 37 and 38 may engage the sockets 19 and 20, respectively, in the fifth wheel.

When the trailer is detached from the tractor, the pins 37 and 38 project downwardly out of their respective housings, and it will be evident that when the tractor is backed under the forward end of the trailer, these pins will be engaged by the downwardly inclined portion of the central guideway 18, and they will be forced into their housings and then projected by their springs into the sockets 19 and 20, when they are brought into registry therewith. The pins will therefore couple the trailer to the fifth wheel. During the backward movement of the tractor, spring-pressed guide-pieces $w$, at the forward ends of the side portions of the trailer frame ride on to the side guideways 16 and 17, causing the supporting frame 4 to be lifted away from the ground and the weight of the forward end of the trailer is then carried by the tractor.

The pins 37 and 38 serve as coupling pins for connecting the trailer to the tractor, and the pin 37 serves as a means for transmitting the power of the foot brake 25 to the trailer wheels. The pin 38 also has a braking function, as hereinafter explained. As shown, the upper end of the pin 37 is connected by a cable 44 to the brakes of the trailer, this cable passing around a pulley 45, so that an upward movement of the pin 37 will apply tension to the brakes. By operating the foot lever 25, the ejector 21 may be moved upward and this in turn will cause the pin 37 to move upward and apply the brakes. Thus, when the tractor and trailer are coupled together, the operator may apply the brakes at will.

The cable 29, which operates the ejector 22, has a connection 46 with the cable 23, by means of which when the lever 30 is operated, both cables will be drawn taut, and both of the ejectors 21 and 22 will be moved to their upper limits, thus pushing the pins 37 and 38 out of the sockets 19 and 20, and uncoupling the trailer from the tractor. It is important, in order to properly disengage the tractor from the trailer, that the brakes of the latter shall be set, and it will be evident that when the pin 37 is moved upward, drawing the cable 44 taut, that result will be attained. The pin 38 is also connected to the brake cable 44 by a hitch 44ᵃ, passing around a pulley 46, so that when the pin 38 is moved upward, it will also apply tension to the brakes.

From the foregoing, it will be seen that when the operator desires to uncouple the trailer from the tractor, he throws both of the coupling pins upward, by operating the lever 30, thus ejecting these pins from the sockets in the fifth wheel and simultaneously applying the brakes to the trailer. The tractor is then started forward and the pins ride on the guideways 18, thus holding the brakes set so that the trailer cannot follow while the tractor is moving out of engagement with it. In coupling the tractor to the trailer, it is equally important to have the brakes set on the trailer in order to prevent backward movement of the latter. It will be evident that when the tractor is backed into engagement with the trailer, the pin 38 will first engage and be moved upward by the inclined guideway 18, and this will cause the brakes on the trailer to be set. As the tractor moves farther backward, the pin 37 will be moved upward and apply tension to the brakes; but when the pins drop into the sockets in the fifth wheel, to couple the parts together, the brakes will be automatically released.

In backing the tractor into engagement with the trailer, the side guideways 16 and 17 engage the arms 4ᵃ on the support 4, and fold the latter, the dog 7 being released by the lifting of the weight of the trailer from the support which relieves the pressure on the brace 8. The frame 4 may be used as a means for holding the brakes in set position when the frame is unfolded, by connecting a hitch 49 from an arm 49ª on the supporting frame to the brake cable 44. When the tractor is uncoupled and moved away from the trailer, the frame 4 drops by gravity and if this hitch is connected, the brakes, which have been set by the upward positions of the coupling pins will be held in set position by the support 4, which is locked in vertical position by the dog when unfolded.

In Figs. 4 and 5 of the drawing, I have shown a modified form of mechanism for folding and unfolding the support for the forward end of the tractor. In these views, a notched bar or rack 50, extending longitudinally of the tractor, supports the trolley or carrier 51, which has a spring-pressed pawl or dog 52, for engaging the notches in the bar. The frame 4 is connected by the brace 8 to the dog, and the latter is pressed toward the notches by a spring 53. With this arrangement, when the support is resting upon the ground, the spring will force the dog into locking engagement with the rack; but if the forward end of the trailer is lifted, the weight of the support will withdraw the pawl from the rack, and if the trolley is now moved backward on the rack bar, to fold the support, the weight of the support, acting through the brace, will hold the pawl out of engagement with the rack, against the action of the spring. In connection with this structure, I provide means whereby, when the tractor is backed into lifting engagement with the trailer, the trolley which carries the pawl will be moved backward, thus causing the support to be moved to the folded position, where it will be held as long as the tractor is coupled to the trailer. When the tractor is uncoupled, and as it moves out of engagement with the trailer, the support drops to the vertical position, by gravity, holding the pawl out of engagement with the rack until the weight of the trailer rests upon the support, when the brace will cause the pawl to lock with the rack. As shown, a cable 53' is connected to the trolley through an angle lever 55 which engages the pawl, and this cable extends around the pulleys 56 and 57, at the rear end of the rack, and thence to the forward end of the trailer. A fitting 54 on the forward end of the cable depends in line with a fork 58 on the fifth wheel, and when the tractor is backed into engagement with the trailer, this fork couples with said fitting and the further backward movement of the tractor causes the support 4 to lift from the ground, thus releasing the dog from the rack, and the tension applied to the cable causes the trolley to move backward and fold the supporting frame.

The two pins which couple the trailer to the tractor and also actuate the brake mechanism in the manner heretofore described, also serve the useful purpose of preventing the tractor and trailer from becoming accidentally uncoupled when the train is moving over sharp ridges or depressions in the roadway, which may cause the tractor and trailer to make sharp upward or downward angles with one another. Thus, in going over a ridge, if the forward pin becomes uncoupled, the rear pin will hold, and in going through a sharp depression if the rear pin pulls out, the forward pin will hold.

It will be evident that if the operator desires, or finds it necessary, to couple the tractor to the trailer while the latter is standing at an angle to the tractor, he may do so by first turning the fifth wheel so that the guideways thereon will be substantially in line with the trailer body, and then backing the tractor.

What I claim is:

1. The combination with a tractor, of a fifth wheel mounted on the rear end thereof and adapted for connection to a trailer, and means extending to a point adjacent the driver's seat for turning said fifth wheel about its axis.

2. The combination with a tractor, of a fifth wheel mounted on the rear end thereof and having sockets arranged one in advance of the other at opposite sides of its axis, a trailer having at its forward end pins arranged one in advance of the other, adapted to engage said sockets, and means operable from a point in advance of the fifth wheel for ejecting said pins from said sockets.

3. The combination with a trailer having wheels and brakes at its rear end, a vertically movable pin at its forward end, connections from said pin to the brakes for setting the latter when the pin is moved upward, and a tractor having an inclined way adapted to engage and lift said pin when the tractor is backed into engagement with the trailer and having a socket adapted to receive said pin.

4. The combination with a trailer having wheels and brakes at its rear end, a folding support near its forward end and connections for setting the brakes when the support is unfolded, of a tractor and means operable by the tractor for successively applying tension to the brakes, folding said support, coupling the trailer to the tractor and finally releasing the brakes.

5. The combination with a trailer having wheels and brakes at its rear end and a support near its forward end, of a tractor and means operable by the tractor for successively applying tension to the brakes, lifting the forward end of the trailer, coupling the trailer to the tractor and finally releasing the brakes.

6. A trailer having wheels at its rear end and brakes for engaging said wheels, a support at the forward end of the trailer body, connections between said support and the brakes adapted to set the latter when the support engages the ground, a rack extending longitudinally of the body, a dog adjustable on the rack and a brace hinged to said dog and support, said dog adapted to lock the brace when the support engages the ground, a tractor, and means operated thereby for lifting the forward end of the trailer, releasing the dog and folding said support and coupling the trailer to the tractor.

7. A trailer having wheels at its rear end and brakes for engaging said wheels, a folding support at the forward end of the trailer body, connections between said support and the brakes adapted to set the latter when the support engages the ground, a rack extending longitudinally of the body, a dog adjustable on the rack and a brace hinged to said dog and support, said dog adapted to lock the brace when the support engages the ground, a tractor, and means operated thereby for successively applying tension to the brakes, releasing the dog, folding said support, coupling the trailer to the tractor and releasing the brakes.

8. The combination with a trailer having wheels and brakes at its rear end, a folding support near its forward end, connections for setting the brakes when the support is unfolded, a rack, a dog normally engaging the rack, a brace connecting the dog with the support, a tractor, means operable by the tractor for releasing the dog from the rack and moving the dog rearwardly, and means for coupling the trailer to the tractor.

9. The combination with a tractor of a fifth wheel mounted on the rear end thereof, a trailer having its forward end adapted to rest on said fifth wheel, and two vertically movable pins arranged one in advance of the other, adapted to connect said forward end to said wheel.

In testimony whereof I affix my signature.

MANSELL A. DAVIS.